United States Patent [19]

Sato et al.

[11] 4,056,661

[45] Nov. 1, 1977

[54] ROLLED ADHESIVE SHEET HAVING PRINTABLE AND STRIPPABLE PROPERTIES AND PROCESS FOR PRODUCING THE SAME

[75] Inventors: Yo Sato; Keisuke Enomoto, both of Tokyo, Japan

[73] Assignee: Kabushiki Kaisha Sato, Japan

[21] Appl. No.: 705,661

[22] Filed: July 15, 1976

Related U.S. Application Data

[63] Continuation of Ser. No. 528,565, Nov. 29, 1974, abandoned.

[51] Int. Cl.$^2$ .................... B05D 1/36; B05D 5/02; B32B 3/10; B32B 5/16; C09J 7/04
[52] U.S. Cl. ..................... 428/144; 427/203; 427/204; 427/205; 428/143; 428/352; 428/354
[58] Field of Search ............ 428/352, 354, 142, 143, 428/144; 427/203, 204, 205

[56] References Cited

U.S. PATENT DOCUMENTS

| | | | |
|---|---|---|---|
| 2,785,087 | 3/1957 | Franer et al. | 428/352 |
| 3,543,920 | 12/1970 | Crocker | 428/354 |

FOREIGN PATENT DOCUMENTS

| | | | |
|---|---|---|---|
| 6,606,239 | 11/1966 | Netherlands | 427/208 |
| 915,195 | 1/1963 | United Kingdom | 428/354 |

*Primary Examiner*—J.C. Cannon

[57] ABSTRACT

The pigment layer side of a base sheet having a layer of tacky adhesive on one side and a layer of pigment and a binder therefor on the opposed side is coated with a silicon composition. The coarse surface texture of the pigment layer contributes to the formation of a discontinuous silicon composition layer. The discontinuities in the silicon layer enable the side of the base sheet associated therewith to be printable and strippable with respect to the tacky adhesive.

10 Claims, 2 Drawing Figures

ROLLED ADHESIVE SHEET HAVING PRINTABLE AND STRIPPABLE PROPERTIES AND PROCESS FOR PRODUCING THE SAME

This is a continuation, of application Ser. No. 528,565 filed Nov. 29, 1974, now abandoned.

BACKGROUND OF THE INVENTION

This invention relates generally to sheet and tape structures coated on one surface thereof with a pressure-sensitive or tacky adhesive (hereinafter referred to as an adhesive sheet) and more particularly to an adhesive sheet which has printability and is not provided with a strip-off type backing sheet and to a process for producing the same. This roll is hereinafter referred to in some cases as an adhesive label roll.

An adhesive label roll comprises, essentially, a base sheet layer (ordinarily of paper) having one surface possessing printability and a layer of a pressure-sensitive adhesive or tacky material provided laminately on the opposite surface of the base sheet layer and is wound into the form of a roll, that is, in a state where the laminated layers have been rolled up with the printable surface on the outer side, which is desirable from the viewpoint of use or preservation. In a roll of this character, the exposed surface of the printable base material layer inevitably faces and contacts the layer of the tacky adhesive material. Consequently, when the adhesive label sheet is to be unrolled by pulling from the roll, it unrolls with difficulty, or tearing of the paper or stripping between the paper layers thereof occurs, and clean and easy unrolling cannot be accomplished.

Accordingly, in adhesive label rolls known heretofore, strip-off paper is used as a base or backing paper. That is, in order to prevent the outer surface of the printable base material from directly contacting the confronting tacky adhesive layer, the roll is wound with a non-tacky strip-off sheet such as paper coated with a silicone resin interposed between the roll layers.

In an adhesive label roll of known character wherein strip-off paper is used, the roll diameter becomes large and, accordingly, the weight of the roll becomes large, whereby the handling thereof becomes inconvenient. Furthermore, since the material cost of the strip-off paper in some cases exceeds one half of that of the adhesive label roll, the use of strip-off paper gives rise to a problem also from the viewpoint of economy.

While it may appear to be possible to solve these problems by rendering non-tacky the exposed surface of the printable base layer by a processing such as coating with a silicone resin, for example, instead of providing an independent non-tacky layer (strip-off layer), the surface loses its capability of accepting printing ink in this case because of the water-repellent and oil-repellent nature of the silicone resin, whereby the printability of the surface is lost.

SUMMARY OF THE INVENTION

In view of the above described state of the art and accompanying difficulties, it is an object of this invention to provide an adhesive sheet roll in which these difficulties are overcome by a process by which the exposed surface of the printable base layer is rendered non-tacky with respect to the confronting and contacting adhesive material layer and, moreover, the printability of the surface is retained.

This object and other objects are achieved by the provision in accordance with the invention of a silicone resin layer in a fine, discontinuous state on the printing surface through a pigment layer as described hereinafter. Furthermore, since printability and strippability (separability) are both simultaneously imparted to the exposed surface of the base layer by this provision, there is no need to use a strip-off paper sheet, whereby the aforedescribed problems relating to the use of a strip-off paper sheet are eliminated. Since the provision of the silicone resin layer in a specific state is relatively simple, in general, the economic advantage arising from the absence of a strip-off paper layer can be fully utilized.

According to this invention in one aspect thereof, briefly summarized, there is provided an adhesive sheet possessing printability and strippability comprising a base sheet layer, a pigment layer formed on one surface of the base sheet layer and comprising a pigment and a binder therefor, a silicone resin layer formed on the pigment layer, and a tacky adhesive layer formed on the other opposite surface of the base sheet layer, the adhesive sheet being characterized in that the silicone resin layer is existing in a fine discontinuous state with finely dispersed parts substantially devoid of the silicone resin whereby the strippability of the silicone resin layer from the tacky adhesive layer after adhesively contacting the same is assured, and the parts substantially devoid of the silicone resin assure acceptance of printing inks by the sheet and printability thereof.

According to this invention in another aspect thereof, there is provided a process for producing an adhesive sheet as set forth above.

A feature of the adhesive sheet according to this invention is that it can be wound into a roll with the silicone resin layer disposed on the outer convex side of the sheet and in adhesive contact at parts thereof with the tacky adhesive layer without the necessity of the interposition of a strip-off base paper therebetween.

The nature, principle, and utility of this invention will be more clearly apparent from the following detailed description, beginning with a consideration of general features of the invention and concluding with specific examples of practice constituting preferred embodiments of the invention.

BRIEF DESCRIPTION OF THE ILLUSTRATIONS

In the illustrations:

DETAILED DESCRIPTION

Figure 1:
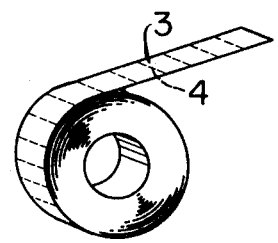
FIG. 1 is a perspective view showing one example of an adhesive label roll having printability according to the invention.
Figure 2:
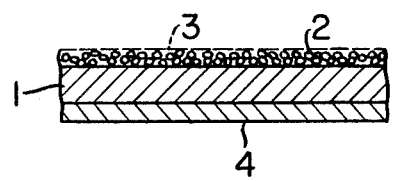
FIG. 2 is an enlarged cross section of the sheet unrolled from the roll shown in FIG. 1.

In the practice of this invention, in general, a suitable pigment layer 2 as shown in FIG. 2 is first formed on a surface of a base sheet layer 1, which is ordinarily paper but may be a paper-like plastic sheet or the like depending on the necessity.

More specifically, an inorganic pigment, an organic pigment, or a mixture of pigments is applied as a coating together with a binder to form the layer 2. Examples of usable inorganic pigments for this purpose are clay, talc, titanium dioxide, terra alba, bentonite, calcium carbonate, barium sulfate, zinc oxide, silica, and alumina. Examples of usable organic pigments are cellulose powder, starch particles, and phthalocyanine pigment synthetic resin powders. Examples of usable binders are water-dispersible polymers such as milk casein, oxidized starch, and polyvinyl alcohol and latexes such as polystyrene butadiene, polyacrylic esters, and ethylene-vinyl acetate copolymer.

We have found that the binder should be blended in a quantity in the range of from 5 to 25 percent relative to the pigment and that, if the quantity falls outside of this range, strippability and printability cannot be obtained at the same time.

On the pigment layer formed in this manner, a silicone resin layer 3 is formed in a manner such that it exists in a fine discontinuous state. This term "fine discontinuous state" herein designates a state wherein the silicone resin layer is not constituting an absolutely continuous phase completely covering the above described pigment layer, but parts in each of which a silicone resin layer exists and parts without silicone resin layer are finely and uniformly dispersed.

Accordingly, this state can occur in two forms, namely, that in which the silicone resin layer exists in the state of fine dots on the pigment layer (i.e., the silicone resin layer constitutes a dispersed phase, while the pigment layer constitutes a continuous phase) and that in which the pigment layer is exposed in the state of fine dots in the silicone resin layer (i.e., the silicone resin layer constitutes a continuous phase, while the pigment layer constitutes a dispersed phase).

In either of these forms, the parts without the silicone resin layer assure acceptance of the printing ink. Therefore, the degree of "fineness" of the discontinuous state of the silicone resin layer means fineness of a degree such that the ink is received in these minute parts without the silicone resin, and the aggregate figure constituted by these minute parts thus bearing the ink becomes legible as a printed character and/or marks.

Furthermore, since the parts without the silicone resin act as ink accepting parts in this manner, the degree of absence of the silicone resin is also determined from this viewpoint as long as the parts where the silicone resin is absent behaves in this manner. That is, the silicone resin need not be completely absent, and, therefore, the term "parts without the silicone resin" is intended to include parts wherein the silicone resin is existing in low concentration.

We have found that, in order to provide a silicone resin layer of this character, it is desirable that the silicone resin be applied as a solution of relatively low concentration of the order of from 1 to 25 percent by weight. If the silicone resin concentration is lower than 1 percent, the strippability will decrease, while, if it exceeds 25 percent, the silicone resin layer will become continuous, and parts without the silicone resin, which become ink-accepting parts, will not be formed.

Then, the silicone resin layer 3 can be formed in a fine discontinuous state by utilizing the coarse surface texture of the pigment layer 2 to apply with a roll the silicone resin dissolved in an organic solvent only on the convexities of the coarse surface and then baking the resin thus applied, or by utilizing a gravure roll. For this process, it is possible to blend colloidal silica beforehand with the silicone resin, in which case convenience is afforded in obtaining a fire discontinuous layer of the silicone resin.

The paper surface having the layers 2 and 3 formed in the above described manner has the property of being easily strippable when its fine, dotted, discontinuous layer of the silicone resin contacts a tacky adhesive and, at the same time, has the property of accepting water inks and oil inks at its parts without the silicone resin (including the extremely small parts as mentioned hereinbefore), whereby the paper surface possesses printability. Furthermore, after the ink has been accepted in the parts without the silicone resin, it permeates into the interior of the pigment layer 2 to form an image.

The term "printability" is herein used to designate the capability of forming an image or picture by means of various printing inks such as offset printing ink, gravure ink, relief printing ink, and flexo ink, and, in some cases, combinations of various printing processes are carried out. That is, it is also possible to carry out offset printing beforehand on the surface of the adhesive paper of the present invention and thereafter to impart print thereon with a flexo plate. Furthermore, in some cases where a material such as terra alba or colloidal silica has been applied together with a binder onto the adhesive paper surface, it is also possible, by printing with a colorless dye solution such as that of leuco dye or a lactone type dye, to render the printing as color printing.

On one hand, while there is no particular restriction to the kind of tacky adhesive used for the adhesive layer 4, an adhesive having low fluidity is preferable. The reason for this is that, if the tacky adhesive has high fluidity, it will flow into the parts without the silicone resin and give rise to a lowering of the strippability. Accordingly, for facilitating the paying out or unrolling of the sheet which is in a rolled up state, a tacky adhesive of high cohesiveness and low fluidity which will not easily deform and flow to parts such as the parts without the silicone resin is desirable. More specifically, it is desirable to use an aqueous dispersion resin or solution type resin of acrylic cross linking-type, for example. Tacky adhesives of rubber vulcanization type are also useful in some cases.

The fact that the silicone resin is existing in a fine discontinuous state on the adhesive paper surface according to the invention can be determined in the following manner.

The following two kinds of paper are prepared,
a. A paper having on its surface a continuous structure of silicone resin without any pigment layer. (Conventional silicone-resin strip-off paper.).
b. Adhesive paper having a pigment layer of the present invention.

Black flexo ink is dropped in a quantity 0.5cc on each of these papers a) and b), and a filter paper is immediated applied thereto to remove the solution. As a result, no trace of coloring by a dye is left on the paper a), but on the paper b), the dropped state of the ink remains unchanged as coloring, and a clear dropped image is formed. The reason for this result is simply that, on the surface of the adhesive paper of the invention, the silicone resin layer exists in a fine discontinuous state.

In order to indicate more fully the nature and utility of this invention, the following specific examples of practice constituting preferred embodiments of the invention are set forth, it being understood that these examples are presented as illustrative only and that they are not intended to limit the scope of the invention.

EXAMPLE 1

A sheet of hardwood, bleached kraft paper of a basic weight of 65 grams/m$^2$ is coated on one surface thereof by means of an air knife coater with a coating solution of the following composition applied in a quantity (solid content) of 20 grams/m².

| titanium dioxide | 100 | parts |
|---|---|---|
| sodium polyphosphate | 0.2 | " |
| polyvinyl alcohol | 10 | " |
| SBR latex (solid content) | 5 | " |
| Water | 120 | " |

On the upper layer thus coated, a composition coating solution of 100 parts of a baking type silicone resin comprising dimethylpolysiloxane and methylhydrodienepolysiloxane, 5 parts of a baking catalyst, and 1,000 parts of toluene is applied as a coating in a quantity (solid content) of 1 gram/m² and baked.

The other (reverse) surface of the sheet thus obtained is coated with at tacky adhesive, comprising 100 parts of polybutyl acrylate and 3 parts of a cross-linking agent, applied in a quantity (solid content) of 30 grams/m². The sheet thus coated is wound into a roll with the tacky adhesive side as the inner surface.

The resulting roll can be unrolled with a light tension, and the outer surface (opposite that of the tacky adhesive) possesses printability, being printable with oil inks and water inks.

EXAMPLE 2

A sheet of the same kind of paper as in Example 1 is coated on one surface thereof by means of an air knife coater with a coating solution of the following composition applied in a quantity (solid content) of 20 grams/m².

| wheat flour starch particles | 100 | parts |
|---|---|---|
| oxidized starch | 10 | " |
| water | 150 | " |

On the upper layer thus coated, an emulsion type silicone resin of a concentration of 10% is applied together with a catalyst in a quantity (solid content) of 1 gram/m² and baked.

The other (reverse) surface of the sheet as obtained is coated with a tacky adhesive and then wound into a roll similarly as in Example 1.

As a result, a roll having properties equivalent to those of the roll in Example 1 is obtained.

We claim:

1. In an adhesive sheet having printability and strippability characteristics comprising a paper base sheet layer, a pigment layer provided on one surface of the base sheet layer comprising a pigment and a binder therefor, a silicone resin layer provided on the pigment layer, and a tacky adhesive layer provided on the other opposite surface of the base sheet layer, the improvement consisting in that the silicone resin layer exists in a fine discontinuous state with finely dispersed parts substantially without a silicone resin film whereby strippability thereof from the tacky adhesive layer after adhesively contacting the same is assured, and said parts substantially without a silicone resin film assure acceptance of printing inks by the sheet and printability thereof.

2. The improvement of claim 1 wherein the pigment is applied from an aqueous system.

3. An adhesive sheet having printability and strippability characteristics comprising a paper base sheet layer, a pigment layer of a coarse surface texture provided on one surface of the base sheet layer comprising a pigment selected from the group consisting of cellulose powder, starch particles, phthalocyanine pigment, synthetic resin powders, clay, talc, titanium dioxide, terra alba, bentonite, calcium carbonate, barium sulfate, zinc oxide, silica, alumina, and mixtures thereof and a binder therefor selected from the group consisting of milk casein, oxidized starch, polyvinyl alcohol, polystyrene butadiene, polyacrylic esters, and ethylene-vinyl acetate copolymers employed in a quantity of from 5 to 25 percent by weight relative to the pigment; a silicone resin layer provided on the pigment layer, and a tacky adhesive layer provided on the other, opposite surface of the base sheet layer, said silicone resin layer existing in a fine discontinuous state with finely dispersed parts, said fine discontinuous state having been generated by coating silicone resin on the coarse surface of the pigment layer in a solution concentration of 1 to 25 percent by weight thereby enabling strippability to the sheet from the tacky adhesive layer after adhesively contacting the same, substantially without the presence of a silicone resin film to assure the printability of the sheet and acceptance thereof of printing inks.

4. The adhesive sheet of claim 3 wherein the pigment is applied from an aqueous system.

5. An adhesive sheet as claimed in claim 3 which is in the form of a roll wound with a fine discontinuous and dispersed silicone resin layer disposed on the outer convex side of the sheet and in adhesive contact at parts thereof with the tacky adhesive layer.

6. In a process for producing an adhesive sheet having printability and strippability characteristics which comprises coating one surface of a paper base sheet layer with a pigment together with a binder thereby to form a pigment layer, coating the pigment layer with a silicone resin thereby to form a layer thereof, and coating the other opposite surface of the base sheet layer with a tacky adhesive thereby to form a layer thereof, the improvement consisting in that the silicone resin layer is formed in a fine discontinuous state with finely dispersed parts substantially without a silicone resin film whereby the strippability thereof from the tacky adhesive layer after adhesively contacting the same is assured, and said parts substantially without a silicone resin film assure acceptance of printing inks by the sheet and printability thereof.

7. The improvement of claim 6 wherein the pigment is applied from an aqueous system.

8. A process for producing an adhesive sheet having printability and strippability which comprises coating one surface of a paper base sheet layer with a pigment selected from the group consisting of cellulose powder, starch particles, phthalocyanine pigment, synthetic resin powders, clay, talc, titanium dioxide, terra alba, bentonite, calcium carbonate, barium sulfate, zinc oxide, silica, alumina, and mixtures thereof together with a binder selected from the group consisting of milk casein, oxidized starch, polyvinyl alcohol, polystyrene butadiene, polyacrylic esters, and ethylene-vinyl acetate copolymers employed in a quantity of from 5 to 25 percent by weight relative to the pigment to form a pigment layer of a coarse surface texture, coating said pigment layer with a silicone resin thereby to form a layer thereof, and coating the other opposite surface of the base sheet layer with a tacky adhesive thereby to form a layer thereof, the silicone resin layer being formed from a solution concentration of 1 to 25 percent by weight in a fine discontinuous state with finely dispersed parts whereby the strippability thereof from the tacky adhesive layer after adhesively contacting the same is assured, substantially without the presence of a silicone resin film, thus assuring acceptance of printing inks by the sheet and printability thereof.

9. A process for producing an adhesive sheet as claimed in claim 8 comprising the further step of winding the adhesive sheet into a roll with a fine discontinuous and dispersed silicone resin layer disposed on the outer convex side of the rolled-up sheet and in adhesive contact at parts thereof with the tacky adhesive layer.

10. The process of claim 8 wherein the pigment is applied from an aqueous system.

* * * * *